US011443165B2

(12) United States Patent
Wang et al.

(10) Patent No.: US 11,443,165 B2
(45) Date of Patent: Sep. 13, 2022

(54) FOREGROUND ATTENTIVE FEATURE LEARNING FOR PERSON RE-IDENTIFICATION

(71) Applicant: DeepNorth Inc., Foster City, CA (US)

(72) Inventors: Jinjun Wang, San Jose, CA (US); Sanpin Zhou, Xi'an (CN)

(73) Assignee: DeepNorth Inc., Redwood City, CA (US)

( * ) Notice: Subject to any disclaimer, the term of this patent is extended or adjusted under 35 U.S.C. 154(b) by 1001 days.

(21) Appl. No.: 16/164,577

(22) Filed: Oct. 18, 2018

(65) Prior Publication Data

US 2020/0125925 A1 Apr. 23, 2020

(51) Int. Cl.
*G06N 3/04* (2006.01)
*G06N 3/08* (2006.01)
*G06V 40/10* (2022.01)

(52) U.S. Cl.
CPC .............. *G06N 3/0454* (2013.01); *G06N 3/08* (2013.01); *G06V 40/103* (2022.01)

(58) Field of Classification Search
CPC ........ G06N 3/0454; G06N 3/08; G06N 3/084; G06N 3/04; G06N 20/00; G06N 3/126; G06N 3/082; G06N 7/005; G06N 20/10; G06N 20/20; G06V 40/103; G06V 10/82; G06V 30/413; G06V 10/28; G06V 10/40; G06V 10/26; G06V 20/52; G06V 10/267; G06V 30/40; G06V 40/161; G06V 10/7515; G06V 20/46; G06V 30/148; G06V 20/40; G06V 20/53; G06V 40/10; G06V 40/20; G06V 10/42; G06V 10/44; G06V 10/757; G06V 40/23; G06V 10/443; G06V 10/20; G06V 10/235; G06V 10/24; G06V 20/20; G06V 2201/06; G06V 30/146; G06V 2201/10; G06V 40/1335; G06V 40/1376; G06V 40/165; G06V 40/171; G06V 40/172; G06V 40/70; G06K 9/6234; G06K 9/6256; G06K 9/00; G06K 9/629; G06K 9/628; G06K 9/6268; G06K 9/6267;
(Continued)

(56) References Cited

U.S. PATENT DOCUMENTS

2017/0032285 A1* 2/2017 Sharma .................. G06N 3/084
2018/0157939 A1* 6/2018 Butt ....................... G06V 10/82
(Continued)

*Primary Examiner* — Nimesh Patel
(74) *Attorney, Agent, or Firm* — David R. Stevens; Stevens Law Group

(57) ABSTRACT

A foreground attentive neural network is used to learn feature representations. Discriminative features are extracted from the foreground of the input images. The discriminative features are used for various visual recognition tasks such as person re-identification and multi-target tracking. A deep neural network can include a foreground attentive subnetwork, a body part subnetwork and the feature fusion subnetwork. The foreground attentive subnetwork focuses on foreground by passing each input image through an encoder and decoder network. Then, the encoded feature maps are averagely sliced and discriminately learned in the following body part subnetwork. Afterwards, the resulting feature maps are fused in the feature fusion subnetwork. The final feature vectors are then normalized on the unit sphere space and learned by following the symmetric triplet loss layer.

8 Claims, 3 Drawing Sheets

(58) Field of Classification Search
CPC .. G06K 9/6227; G06K 9/6218; G06K 9/6288; G06K 9/6297; G06K 9/6221; G06K 9/6223; G06K 9/6278; G06K 9/6282; G06T 7/11; G06T 2207/10016; G06T 2207/20081; G06T 7/0012; G06T 2207/10024; G06T 2207/20084; G06T 2207/30196; G06T 2207/20221; G06T 2207/30232; G06T 7/10; G06T 9/00; G06T 2207/10012; G06T 7/70; G06T 7/00; G06T 2207/20021; G06T 2207/20024

See application file for complete search history.

(56) References Cited

U.S. PATENT DOCUMENTS

2018/0189642 A1* 7/2018 Boesch ............... G06N 3/0454
2018/0197067 A1* 7/2018 Mody ................ G06F 7/5443

* cited by examiner

FOREGROUND ATTENTIVE FEATURE LEARNING FOR PERSON RE-IDENTIFICATION

TECHNICAL FIELD

The present disclosure relates generally to a system capable of re-identifying a person amongst a set of camera views. The system can use a foreground attentive neural network to strengthen foreground positive influence while weakening background side effects.

BACKGROUND

Person re-identification (RE-ID) aims at identifying the same person of interest amongst a set of camera views. Person re-identification is a challenging task due to appearance variations caused by light conditions, view angles, body poses, and mutual occlusions. Additionally, visual targets captured by surveillance cameras usually suffer from background clutter and mutual occlusion. Thus, learned feature representations are easily affected by the noises from the background. As such, it can be difficult to recognize the matched reference to the anchor from a variety of candidates in the gallery set based on the existing feature representations.

Various approaches for person re-identification have focused on feature representation and metric learning. Feature representation approaches focus on developing a discriminative feature representation which is robust to view angles, light conditions, body poses and mutual conclusion. Metric learning based approaches attempt to find a feature mapping function from the feature space to the distance space, in which feature vectors from the same person being close than those from different persons.

Further deep learning approaches have been applied to the person re-identification problem, in which the deep models are used to extract the feature representations from different input images.

SUMMARY

Aspects of the invention use a foreground attentive neural network to learn feature representations. Discriminative features are extracted from the foreground of the input images. The discriminative features are used for various visual recognition tasks such as person re-identification and multi-target tracking.

A deep neural network can include a foreground attentive subnetwork, a body part subnetwork and the feature fusion subnetwork. The foreground attentive subnetwork focuses on foreground by passing each input image through an encoder and decoder network. Then, the encoded feature maps are averagely sliced and discriminately learned in the following body part subnetwork. Afterwards, the resulting feature maps are fused in the feature fusion subnetwork. The final feature vectors are then normalized on the unit sphere space and learned by following the symmetric triplet loss layer.

More specifically, the foreground attentive neural network is built. The foreground attentive neural network strengthens the foreground positive influence while weakening background side effect. The encoder and decoder subnetworks are designed to guide the neural network to directly learn a feature representation from the foreground of each input image. In addition, a symmetric triplet loss function is used to enhance the feature learning capability by jointly minimizing the intra-class distance and maximizing the inter-class distance in each triplet unit.

Given an input image and a foreground mask, the foreground neural network can incorporate feature learning and foreground mask reconstruction into a joint framework. Foreground mask reconstruction can drive the attention on the foreground of input images in the process of feature learning. The foreground mask can be obtained by using a local regression loss function to supervise foreground mask reconstruction. The local regression loss function considers the local neighborhood of each pixel in reconstruction by measuring the reconstruction errors.

Accordingly, the foreground attentive neural network can address the foreground of input images in feature learning and also perform effective person re-identification.

DETAILED DESCRIPTION

The system can use a foreground attentive neural network to strengthen foreground positive influence while weakening background side effects.

Let $Y=\{X_i, M_i\}_{i=1}^N$ be the input training data, in which $X_i$ denotes the RGB images, $M_i$ represents the mask of foreground and N is the number of training samples. Specifically, $X_i=\{x_i^1, x_i^2, x_i^3\}$ indicates the $i^{th}$ triplet unit, in which $x_i^1$ and $x_i^2$ are two images with the same identity, $x_i^1$ and $x_i^3$ are two images with different identities. Besides, $M_i=\{m_i^1, m_i^2, m_i^3\}$ represents the corresponding foreground mask of $X_i$. The goal of our foreground attentive deep neural network is to learn filter weights and biases that can jointly minimize the ranking error and the reconstruction error at the output layers, respectively. A recursive function for a M-layer deep model can be defined as depicted in equation (1):

$$Y_i^l = \Phi(W^l * X_i^{l-1} + b^l), i=1, 2, \ldots, N; l=1, 2, \ldots, M;$$
$$Y_i^0 = Y_i. \quad (1)$$

where $W^l$ denotes the filter weights of the $l^{th}$ layer to be learned, and $b^l$ refers to the corresponding biases, * denotes the convolution operation, $\Phi(\cdot)$ is an element-wise non-linear activation function such as ReLU, and $Y_i^l$ represents the feature maps generated at layer l for sample $Y_i$. For simplicity, we consider the parameters in the network as whole and define $W=\{W^1, \ldots, W^M\}$, $b=\{b^1, \ldots, b^M\}$ and $\Omega=\{W, b\}$.

Figure 1:
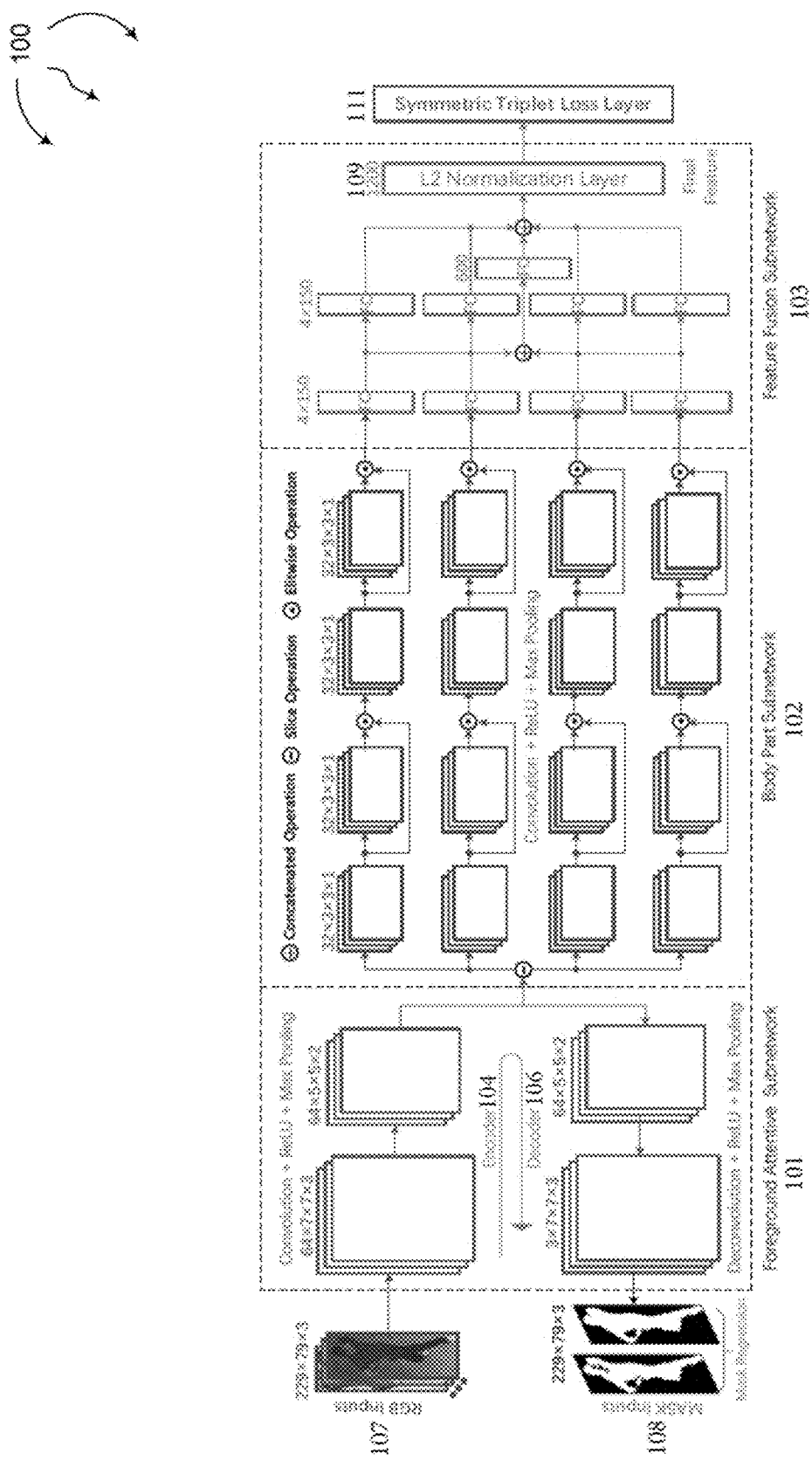
FIG. 1 illustrates an example neural network architecture for person re-identification.

A foreground attentive neural network is configured to learn a discriminative feature representation from the foreground of each input image. FIG. 1 illustrates an example neural network architecture 100 for person re-identification. As depicted, neural network architecture 100 includes foreground attentive subnetwork 101, body part subnetwork 102, and feature fusion subnetwork 103.

Figure 2:
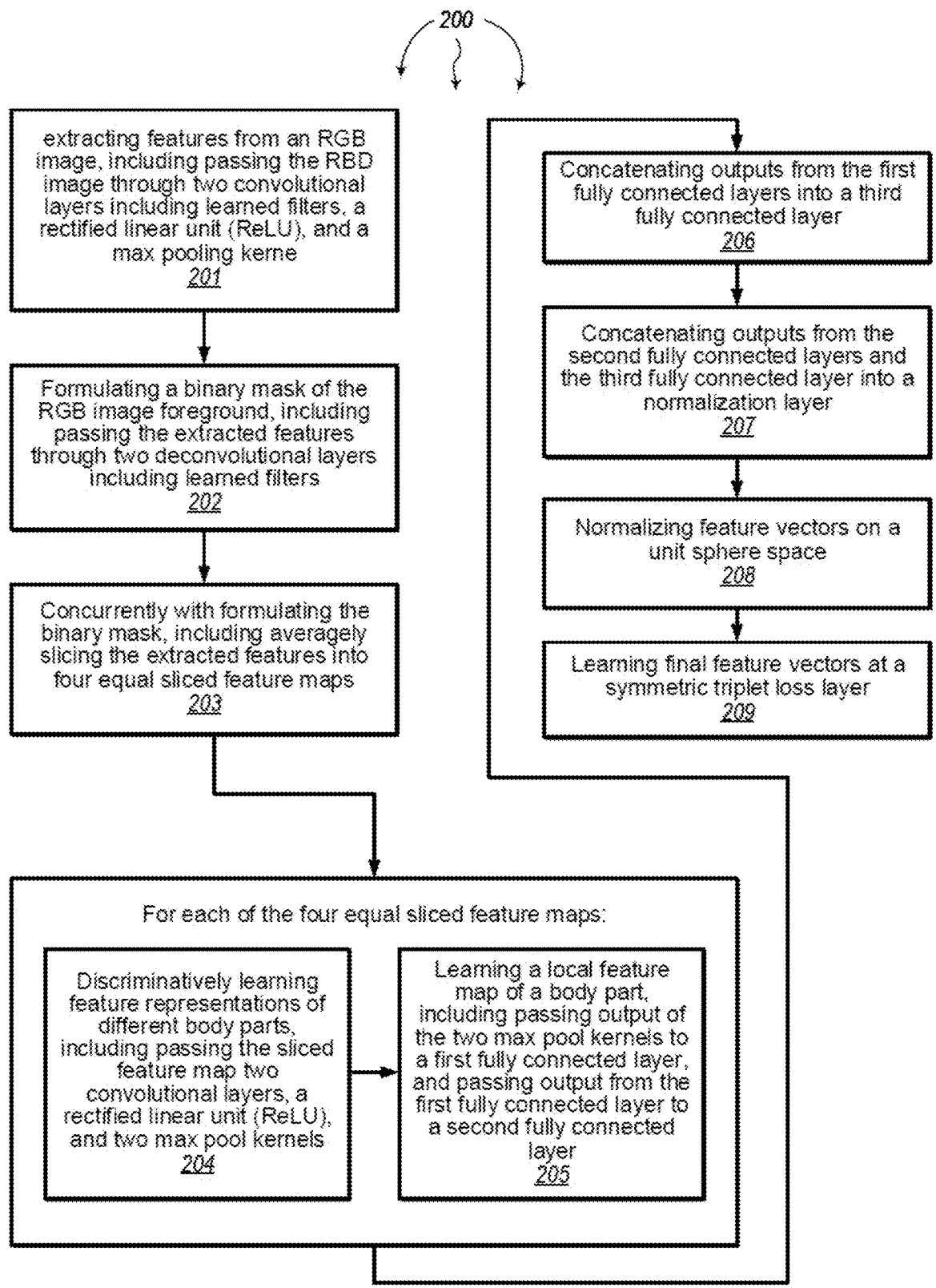
FIG. 2 illustrates a flow chart of an example method for person re-identification.

FIG. 2 illustrates a flow chart 200 of an example method for person re-identification. Method 200 will be described with respect to the components of neural network architecture 100

Foreground attentive subnetwork 101 focuses on the foreground of input images to alleviate the side effects of the background. Each input image is passed through encoder subnetwork 104 and decoder subnetwork 106. Method 200 includes extracting features from an RGB image, including passing the RBD image through two convolutional layers including learned filters, a rectified linear unit (ReLU), and a max pooling kernel (201). For example, encoder subnetwork 104 extracts features from the RGB images 107.

Encoder subnetwork 104 focuses on the foreground, since decoder subnetwork 106 can gradually reconstruct the binary foreground mask in the learning process. Encoder subnetwork 104 includes two 64 learned filters in size of 7×7×3 and 5×5×2, respectively. Encoder subnetwork 104 also includes rectified linear unit (ReLU) and followed by a max pooling kernel in size of 3×3×1. RGB images 107 are first resized in 229×79×3 and passed through the two 64 learned filters in size of 7×7×3 and 5×5×2. The resulting feature maps are then passed through the rectified linear unit (ReLU) and the max pooling kernel.

Method 200 includes formulating a binary mask of the RGB image foreground, including passing the extracted features through two deconvolutional layers including learned filters (202). For example, decoder subnetwork 106 reconstructs binary masks 108 of the foreground persons.

Output of encoder subnetwork 104 is then concurrently fed into (corresponding) decoder network 106 and body part subnetwork 102. Decoder subnetwork 106 includes two deconvolutional layers, which are with 64 and 3 learned filters in size of 5×5×2 and 7×7×3, respectively. In addition, a rectified linear unit (ReLU) is put between the two layers. The output of encoder subnetwork 104 is passed through the two deconvolutional layers and the rectified linear unit (ReLU). Output from decoder subnetwork 106 is used to construct binary masks 108 of the foreground.

Method 200 includes concurrently with formulating the binary mask, averagely slicing the extracted features into four equal sliced feature maps (203). For example, body part subnetwork 102 discriminatively learns feature representations from different body parts. Different body parts can be considered to have different body weights in representing one person. Feature maps from encoder subnetwork 104 are averagely sliced into four equal parts across the highest channel. The four sliced maps are fed into the body part subnetwork 102 for feature learning.

For each of the four equal sliced feature maps, method 200 includes discriminatively learning feature representations of different body parts, including passing the sliced feature map two convolutional layers, a rectified linear unit (ReLU), and two max pool kernels (204). For example, per residual block (slice), body park subnetwork 102 includes first and second convolutional layers, each having 32 learned filters in size of 3×3 with stride 1. The first and second convolutional layers are followed by a rectified linear unit (ReLU). The rectified linear unit (ReLU) is followed by first and second max pooling kernels in size of 3×3 with stride 1.

Also for each of the four equal sliced feature maps, method 200 includes learning a local feature map of a body part, including passing output of the two max pool kernels to a first fully connected layer, and passing output from the first fully connected layer to a second fully connected layer (205). Parameters are not shared between the convolutional layers, so as to discriminatively learn feature representations from different body parts. In each residual block, each sliced feature map is passed through the first and second convolutional layers. The outputs of first convolutional layer are summarized with the outputs of second convolutional layer using the eltwise (element-wise) operation. Output of the eltwise operation is pass to the rectified linear unit (ReLU) The resulting feature maps are passed through the first max pooling kernel. To better learn a discriminative feature representation on large scale datasets, output from the first max pooling kernel is passed to the second max polling layer.

Method 200 includes concatenating outputs from the first fully connected layers into a third fully connected layer (206) and concatenating outputs from the second fully connected layers and the third fully connected layer into a normalization layer (207). For example, feature fusion subnetwork 103 fuses the learned features in representing different body parts and normalizes the final features to a unit sphere space. Feature fusion subnetwork 103 includes four teams of fully connected layers and a L2 normalization layer 109. The local feature maps of each body part are first discriminately learned by following first and second fully connected layers of dimension 150 in each team. Then, a rectified linear unit (ReLU) is added between them. The discriminatively learned features of the first four fully connected layers are concatenated to be fused by following another connected layer of dimension is 600. The, the discriminatively learned features are further concatenated with the outputs of the second four fully connected layers to generate a final 1200 dimensional features for representation.

Method 200 includes normalizing feature vectors on a unit sphere space (208). For example, L2 normalization layer 109 is used to regularize the magnitude of each feature vector to be unit. Therefore, the similarity comparison measured in the Euclidian distance is equivalent to that by using the cosine distance. Method 200 includes learning final feature vectors at a symmetric triplet loss layer (209). For example, the final feature vectors are then normalized on the unit sphere space and learned by following the symmetric triplet loss layer 111.

In order to train the foreground attentive deep neural network in an end-to-end manner, apply a multi-task objective function to supervise the learning process, which is defined as depicted in equation (2):

$$\min_{\Omega, u, v} E(\Omega, u, v) = \sum_{i=1}^{N} L_1(u_i, v_i, \phi(X_i, \Omega_t)) + \zeta L_2(\phi(X_i, \Omega_r), M_i) + \eta R(\Omega), \quad (2)$$

where $L_1(\bullet)$ denotes the symmetric triplet term, $L_2(\bullet)$ represents the local regression term, $R(\bullet)$ indicates the L2 parameter regularization term, and $\zeta$, $\eta$ are two fixed weight parameters. Specifically, $u=[u_1, \ldots, u_N]$ and $v=[v_1, \ldots, v_N]$ are two adaptive weights which control the symmetric gradient back-propagation, $\Omega=[\Omega_r, \Omega_t]$ is the parameters of whole network, $\Omega_t$ is the parameters of deep ranking neural network, and $\Omega_r$ is the parameters of deep regression neural network.

The symmetric triplet loss function can jointly minimize the intra-class distance and maximize the inter-class distance in each triplet unit, which is defined as depicted in equation (3):

$$L_1 = \max\{M + d(x_i^1, x_i^2) - [u_i d(x_i^1, x_i^3) + v_i d(x_i^2, x_i^3)], 0\} \quad (3)$$

where M is the margin between the positive pairs and negative pairs, $u_i$ and $v_i$ are two directional control parameters, and $d(\bullet)$ denotes the pairwise distance.

Differently, measure the distance in the Spherical space, which is defined as depicted in equation (4):

$$d(x_i^j, x_i^k) = \|\phi(x_i^j, \Omega_t) - \phi(x_i^k, \Omega_t)\|_2^2 \quad (4)$$

and normalize $\|\phi(x_i^j, \Omega_t)\|_2^2 = 1$ and $\|\phi(x_i^k, \Omega_t)\|_2^2 = 1$.

Figure 3:
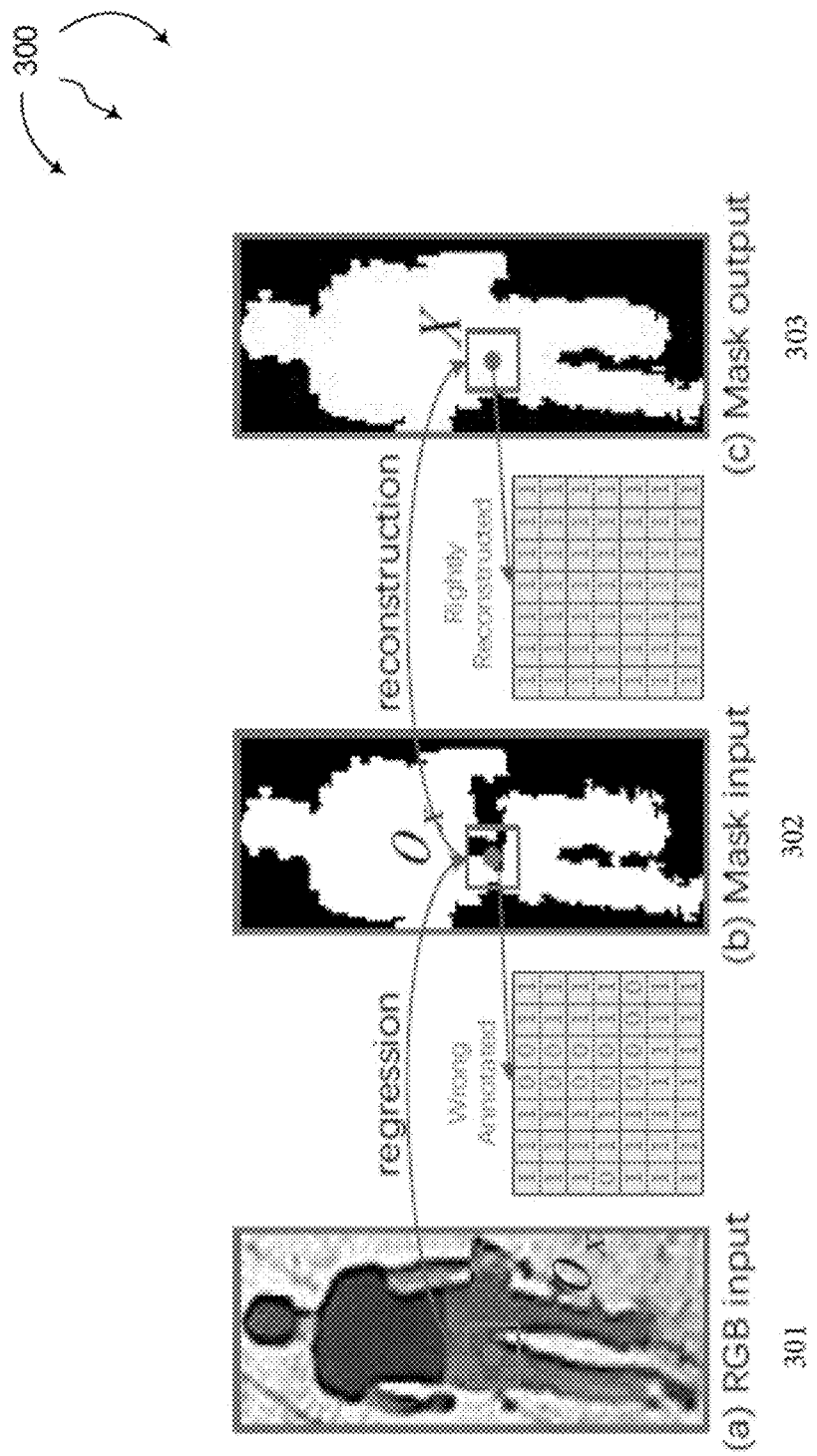
FIG. 3 illustrates an example RGB input, mask input, and mask output.

The local regression loss function minimizes the error in reconstructing the binary foreground mask at the output layer of decoder network. As a consequence, the encoder network will be regularized by the decoder network in the training process, and the attention of encoder network can be gradually focused on the foreground of target. Measure the reconstruction error of each pixel in a local neighborhood, which is formulated as depicted in equation (5):

$$L_2 = \sum_{k=1}^{3} \left\| K_\sigma \otimes \left( \phi(x_i^k, \Omega_r) - m_i^k \right) \right\|_F^2 \quad (5)$$

where $K_\sigma$ represents a truncated Gaussian kernel with the standard deviation of $\sigma$, which is formulated as depicted in equation (6):

$$K_\sigma(x-y) = \begin{cases} \frac{1}{\sqrt{2}\pi} \exp\left(-\frac{|x-y|^2}{2\sigma^2}\right), & \text{if } |x-y| \le \rho \\ 0, & \text{else} \end{cases} \quad (6)$$

where $\rho$ indicates the radius of local neighborhood $O_x$ which is centered at the point of x. By considering reconstruction in a local neighborhood, the performance is more robust to the poor mask annotation. FIG. 3 illustrates an RGB input 301, mask input 302, and mask output 303. In general, some wrongly annotated foreground pixels can be properly rectified by considering the reconstruction in a local neighborhood.

As depicted in FIG. 3, some pixels in the foreground of RGB input 301 are wrongly labeled as the background in mask input 302 (e.g., when measuring single pixel to pixel difference). On the other hand, mask output 303 is proper constructed. To formulated mask output 303, pixel to pixel difference is measured by jointly considering its neighborhood information. That is, a foreground mask can be properly constructed when many (or most) of the pixels in a local neighborhood can be rightly annotated.

The direction control parameters $u_i$ and $v_i$ can be adaptively updated in the training process using the momentum method. In order to simplify this problem, we define $u_i = \alpha_i + \beta_i$ and $v_i = \alpha_i - \beta_i$, and therefore they can be optimized by only updating $\beta_i$. The partial derivative of symmetric triplet term with respect to $\beta_i$ can be formulated as depicted in equation (7):

$$t = \begin{cases} \frac{\partial T(x_i^1, x_i^2, x_i^3)}{\partial \beta_i}, & \text{if } T > 0 \\ 0, & \text{else} \end{cases} \quad (7)$$

where $T = M + d(x_i^1, x_i^2) - [u_i d(x_i^1, x_i^3) + v_i d(x_i^2, x_i^3)]$, and $$\frac{\partial T}{\partial \beta_i}$$

is formulated as depicted in equation (8):

$$\frac{\partial T}{\partial \beta_i} = \|\phi(x_i^2, \Omega_t) - \phi(x_i^3, \Omega_t)\|_2^2 - \|\phi(x_i^1, \Omega_t) - \phi(x_i^3, \Omega_t)\|_2^2 \quad (8)$$

Then, $\beta_i$ can be optimized as depicted in equation (9):

$$\beta_i = \beta_i - \gamma \cdot t \quad (9)$$

where $\gamma$ is the updating rate.

In order to apply the stochastic gradient descent algorithm to optimize the deep parameters, we compute the partial derivative of the objective function as depicted in equation (10):

$$\frac{\partial E}{\partial \Omega} = \sum_{i=1}^{N} l_1(u_i, v_i, \phi(X_i, \Omega_t)) + \zeta l_2(\phi(X_i, \Omega_r), M_i) + \eta \sum_{i=1}^{M} \Omega^i \quad (10)$$

where the first term represents the gradient of symmetric triplet term, the second term denotes the gradient of local regression term, and the third term is the gradient of parameter regularization term.

By the definition of $T(x_i^1, x_i^2, x_i^3)$ in Eq. (7), the gradient of symmetric triplet term can be formulated as depicted in equation (11):

$$l_1 = \begin{cases} \frac{\partial T(x_i^1, x_i^2, x_i^3)}{\partial \Omega_i}, & \text{if } T > 0 \\ 0, & \text{else} \end{cases} \quad (11)$$

where $$\frac{\partial T}{\partial \Omega_t}$$

is formulated as depicted in equation (12):

$$\frac{\partial T}{\partial \Omega_t} = 2(\phi(x_i^1, \Omega_t) - \phi(x_i^2, \Omega_t))' \frac{\partial(\phi(x_i^1, \Omega_t) - \partial\phi(x_i^2, \Omega_t)}{\partial \Omega_t} - \\ 2u_i(\phi(x_i^1, \Omega_t) - \phi(x_i^3, \Omega_t))' \frac{\partial(\phi(x_i^1, \Omega_t) - \partial\phi(x_i^3, \Omega_t)}{\partial \Omega_t} - \\ 2v_i(\phi(x_i^2, \Omega_t) - \phi(x_i^3, \Omega_t))' \frac{\partial(\phi(x_i^2, \Omega_t) - \partial\phi(x_i^3, \Omega_t)}{\partial \Omega_t} \quad (12)$$

According to the definition of local regression term in Eq. (5), the gradient can be formulated as follows depicted in equation (13):

$$l_2 = \sum_{k=1}^{3} 2K_\sigma \otimes (K_\sigma(\phi(x_i^k, \Omega_r) - m_i^k)) \frac{\partial \phi(x_i^k, \Omega_r)}{\partial \Omega_r} \quad (13)$$

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A neural network architecture, comprising:
 a foreground attentive subnetwork, including:
  an encoder subnetwork configured to extract features from an RGB image, including passing the RBD image through two convolutional layers including learned filters, a rectified linear unit (ReLU), and a max pooling kernel; and
  a decoder subnetwork configured to formulate a binary mask of the RGB image foreground, including passing the extracted features through two deconvolutional layers including learned filters;
 a body part subnetwork configured to:
  concurrently with formulating the binary mask, averagely slice the extracted features into four equal sliced feature maps;
  for each of the four equal sliced feature maps:
   discriminatively learn feature representations of different body parts, including passing the sliced feature map two convolutional layers, a rectified linear unit (ReLU), and two max pool kernels; and
   learn a local feature map of a body part, including passing output of the two max pool kernels to a first fully connected layer, and passing output from the first fully connected layer to a second fully connected layer;
 a feature fusion subnetwork configured to:
  concatenate outputs from the first fully connected layers into a third fully connected layer;
  concatenate outputs from the second fully connected layers and the third fully connected layer into a normalization layer; and
  normalize feature vectors on a unit sphere space; and
 a symmetric triplet loss layer configured to learning final feature vectors.

2. The neural network architecture of claim 1, wherein a decoder subnetwork configured to formulate a binary mask of the RGB image foreground comprises the decoder subnetwork mask configured to measure pixel to pixel differences by jointly considering neighborhood information.

3. The neural network architecture of claim 1, wherein a decoder subnetwork configured to formulate a binary mask of the RGB image foreground comprises the decoder subnetwork mask configured to apply a local regression loss function to supervise foreground mask reconstruction.

4. A method for person re-identification, comprising:
 extracting features from an RGB image, including passing the RBD image through two convolutional layers including learned filters, a rectified linear unit (ReLU), and a max pooling kernel;
 formulating a binary mask of the RGB image foreground, including passing the extracted features through two deconvolutional layers including learned filters;
 concurrently with formulating the binary mask, averagely slicing the extracted features into four equal sliced feature maps;
 for each of the four equal sliced feature maps:
  discriminatively learning feature representations of different body parts, including passing the sliced feature map two convolutional layers, a rectified linear unit (ReLU), and two max pool kernels; and
  learning a local feature map of a body part, including passing output of the two max pool kernels to a first fully connected layer, and passing output from the first fully connected layer to a second fully connected layer;
 concatenating outputs from the first fully connected layers into a third fully connected layer;
 concatenating outputs from the second fully connected layers and the third fully connected layer into a normalization layer;
 normalizing feature vectors on a unit sphere space; and
 learning final feature vectors at a symmetric triplet loss layer.

5. The method of claim 4, wherein formulating a binary mask of the RGB image comprises measuring pixel to pixel differences by jointly considering neighborhood information.

6. The method of claim 5, wherein measuring pixel to pixel differences by jointly considering neighborhood information comprises, for each pixel, considering a radius of other pixels in a local neighborhood.

7. The method of claim 4, wherein formulating a binary mask of the RGB image foreground comprises applying a local regression loss function to supervise foreground mask reconstruction.

8. The method of clam 4, further comprising applying a multi-task objective function to supervise training of feature extraction and binary mask formulation.

* * * * *